United States Patent [19]

Hamano

[11] Patent Number: 5,568,197
[45] Date of Patent: Oct. 22, 1996

[54] CAMERA APPARATUS HAVING AN OPTICAL LOW-PASS FILTER

[75] Inventor: Hiroyuki Hamano, Yokohama, Japan

[73] Assignee: Canon Kabushiki Kaisha, Tokyo, Japan

[21] Appl. No.: 856,675

[22] Filed: Mar. 24, 1992

[30] Foreign Application Priority Data

Apr. 8, 1991 [JP] Japan ................................. 3-103124

[51] Int. Cl.⁶ .............................................. H04N 5/225
[52] U.S. Cl. ............................................. 348/342; 348/360
[58] Field of Search ..................................... 359/494, 495, 359/496, 497, 498, 558, 563, 568, 885, 890, 891, 708, 565, 569, 718, 355, 356, 708, 566, 559

[56] References Cited

U.S. PATENT DOCUMENTS

| | | | |
|---|---|---|---|
| 4,105,289 | 8/1978 | Hershel | 359/563 |
| 4,119,361 | 10/1978 | Greenaway | 359/558 |
| 4,176,611 | 12/1979 | Okano | 358/44 |
| 4,477,148 | 10/1984 | Tsuji et al. | 358/55 |
| 4,743,100 | 5/1988 | Nakada et al. | 358/55 |
| 4,878,737 | 11/1989 | Ise | 358/94 |
| 4,998,800 | 3/1991 | Nishida et al. | 359/569 |
| 4,998,801 | 3/1991 | Shikaishi et al. | 358/331 |
| 5,004,330 | 4/1991 | Ishidai et al. | 359/708 |
| 5,015,078 | 4/1991 | Oikawa | 359/708 |
| 5,029,010 | 9/1991 | Shiraishi | 358/225 |
| 5,161,040 | 11/1992 | Yokoyama et al. | 359/19 |
| 5,270,825 | 12/1993 | Takasugi et al. | 348/207 |

FOREIGN PATENT DOCUMENTS

| | | | |
|---|---|---|---|
| 53-119063 | 10/1978 | Japan | H04N 5/74 |
| 63-287921 | 11/1988 | Japan | H04N 9/07 |
| 239011 | 2/1990 | Japan | G02B 15/16 |
| 58-75974 | 5/1993 | Japan | H04N 5/26 |

*Primary Examiner*—Wendy Garber
*Assistant Examiner*—Tuan V. Ho
*Attorney, Agent, or Firm*—Fitzpatrick, Cella, Harper & Scinto

[57] ABSTRACT

A camera apparatus having photographing lenses and an optical low-pass filter for limiting the image information of predetermined spatial frequency components, the filter being disposed at an arbitrary position on the optical axis of the photographing lenses. One of the sides of the optical low-pass filter is formed as a diffraction grating structure having a low pass effect, and the other side is formed in an aspherical shape.

5 Claims, 8 Drawing Sheets

CAMERA APPARATUS HAVING AN OPTICAL LOW-PASS FILTER

BACKGROUND OF THE INVENTION

1. Field the Invention

The present invention relates to a camera apparatus having an optical low-pass filter. More particularly, the present invention relates to a camera apparatus having an optical low-pass filter suited for processing images one-dimensionally and discretely, as in video cameras, electronic still cameras or the like, using color image pick-up elements.

2. Description of the Related Art

In a photographing lens using image pick-up elements, such as CCDs, which obtain output images by discretely sampling image information, if spatial frequency components exceed the frequency limit of the image pick-up elements then, when an object is photographed, a phenomenon, such as a so-called beat, occurs in the prior art. In this situation, moires which have originally not been present in the object appear, or compacted moires appear as thick moires having uneven densities. That is, frequency components which cannot be picked up by a camera apparatus cannot be reproduced as image information, and therefore a phenomenon called a so-called waveform distortion (areaging) occurs.

To suppress this areaging, in a photographing lens of, for example, a video camera, an optical low-pass filter is disposed in the light path of the photographing lens so that the light flux from the object is separated into a plurality of directions. This is accomplished by permitting the light flux to pass through the optical low-pass filter, resulting in a single point image formed on an image photographing plane that is separated into a plurality of point images. As a result, the influence of the areaging is suppressed by limiting the high-band frequency characteristics of the object.

As for optical low-pass filters, various filters using birefringence produced by uniaxial crystals, such as crystallized quartz, or filters in which a diffraction grating is disposed in the light path of a photographing lens and the diffraction effect of the diffraction grating is utilized, are used. Since optical low-pass filters, in particular those using a diffraction grating, can be produced easily by molding plastics, they can be obtained at quite a low price. Therefore, they have been widely used in the photographing lenses of recent video cameras or the like. Optical low-pass filters using a diffraction grating have been disclosed in, for example, Japanese Patent Laid-Open Nos. 53-119063 and 63-287921.

In addition, there has been a demand for a camera apparatus, for use with a commercial-use video camera, which has an optical low-pass effect and high optical performance, and in which the entire photographing lens is made compact since the entire video camera has become compact.

Generally, to maintain a satisfactory optical performance of a photographing lens and at the same time reduce the number of lenses and make the entire lens system compact, it is effective to use aspherical lenses. For example, Japanese Patent Laid-Open No. 2-39011 discloses a compact photographing lens using aspherical lenses. However, aspherical lenses have a problem in that their optical characteristics change greatly due to changes in the environment, such as temperature or humidity, though they can be produced relatively easily by using plastic molds.

By contrast, if aspherical lenses are produced by using glass molds, variations in their optical characteristics due to changes in the environment, such as temperature or humidity, decrease. However, there is a problem in that it becomes difficult to produce them, since, for example, the types of grinding materials which can be used are limited, and maintaining the surface precision satisfactorily is difficult.

SUMMARY OF THE INVENTION

An object of the present invention is to provide a camera apparatus which is capable of easily obtaining a predetermined low-pass effect by having a properly arranged optical low-pass filter therein and lenses, where the number of lenses can be reduced by using aspherical surfaces.

Another object of the present invention is to provide a camera apparatus having an optical low-pass filter in which variations in the optical characteristics are small when a high optical performance is obtained, and having the capability of maintaining a high optical performance at all times.

The camera apparatus having an optical low-pass filter of the present invention has photographing lenses and an optical low-pass filter for limiting image information of predetermined spatial frequency components, the filter being disposed at an arbitrary position on the optical axis of the photographing lenses. One of the sides of the optical low-pass filter is formed as a diffraction grating structure having a low pass effect, and the other side is formed in an aspherical shape. In the present invention, in particular, the paraxial refracting power of the aspherical shape is substantially zero, and the above-described optical low-pass filter is disposed in the vicinity of the aperture diaphragm of the photographing lenses.

According to another aspect of the present invention, the camera apparatus includes a photographing lens with a plurality of movable lens units. In this apparatus, an optical low pass filter is disposed on the image plane side of at least one of the plurality of movable lens units of the photographing lens. One of the sides of the optical low pass filter has formed on it a diffraction grating structure having a low pass effect. The other side of the optical low pass filter is formed in an aspherical shape. The camera apparatus has an image pick-up device disposed on the image plane of the photographing lens. The pick-up device has a plurality of photoelectric conversion elements. A number of lens units are disposed between the optical low pass filter and the image pick-up device. These lens units guide light to the image pick-up device.

The aforementioned and other objects, features and advantages of the present invention will become clear when reference is made to the following description of the preferred embodiments of the present invention, together with reference to the accompanying drawings.

DESCRIPTION OF THE PREFERRED EMBODIMENT

Figure 1:
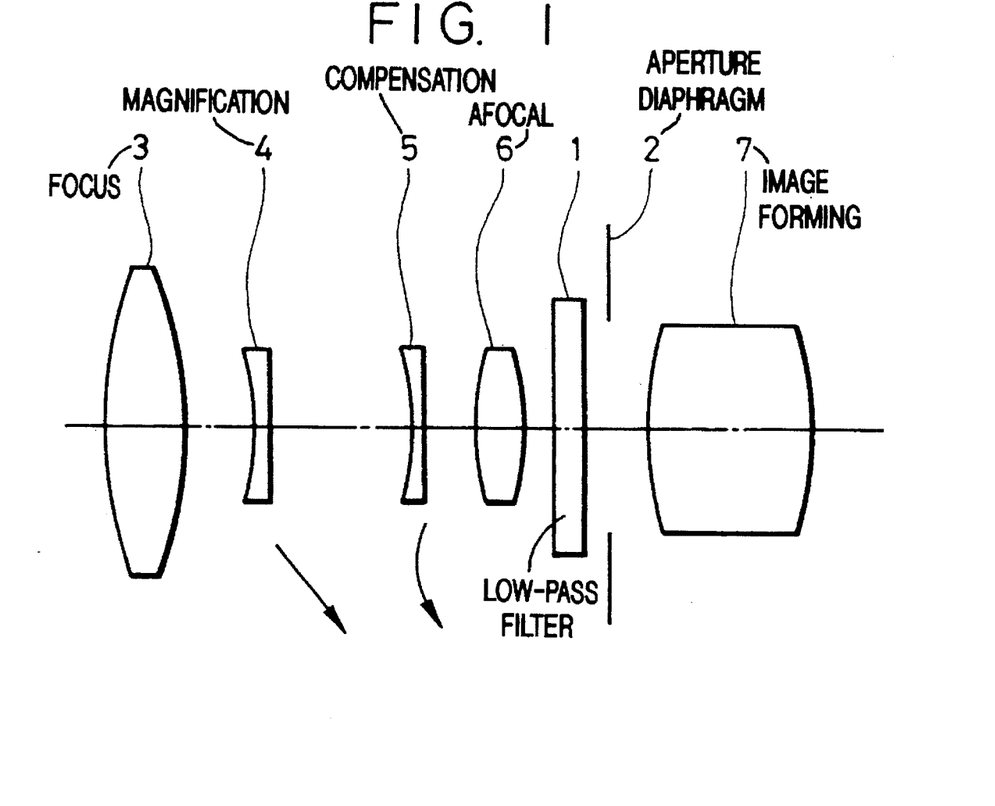
FIG. 1 is a schematic view of an essential portion of an optical system according to a first embodiment of the present invention.

FIG. 1 is a schematic view of an essential portion of an optical system according to a first embodiment of the present invention.

In this embodiment, a so-called five-group type zoom lens, including five lens groups as a whole, is used as a photographing lens. An optical low-pass filter is disposed in the vicinity of the aperture diaphragm of the photographing lens. As a result, a predetermined low-pass effect is obtained.

In FIG. 1, reference numeral 3 denotes a first lens unit having a focusing function and a positive refracting power; reference numeral 4 denotes a second lens unit having a magnification function and a negative refracting power; reference numeral 5 denotes a third lens unit for compensating for the shift of the image plane as a magnification is changed; reference numeral 6 denotes a fourth lens unit for causing a light flux from the third lens unit 5 to emit as a substantially afocal light flux; reference numeral 1 denotes an optical low-pass filter; reference numeral 2 denotes an aperture diaphragm which controls the amount of light to be transmitted; and reference numeral 7 denotes a fifth lens unit for forming an image.

A change in magnification from a wide angle end position to a telephoto end position is made by the photographing lens of the present invention by making the second lens unit 4 and the third lens unit 5 move as shown by the arrows. The optical low-pass filter 1 is disposed in the vicinity of the aperture diaphragm 2.

Figure 2:
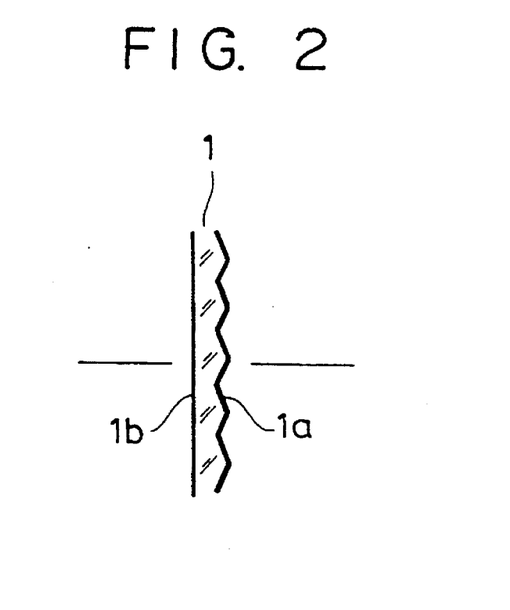
FIG. 2 is a cross-sectional view of an essential portion of the optical low-pass filter of FIG. 1.

As shown in FIG. 2, one of the surfaces 1a of the optical low-pass filter of this embodiment manifests a low-pass effect, and is formed as a diffraction grating, the cross section of which is in the shape of a triangle, saw-tooth or trapezoid, or in the form of a phase type diffraction grating. The other surface 1b is formed in an aspherical shape to achieve satisfactory compensation for aberrations and to obtain a high optical performance. The refracting power of the aspherical shape at this time is substantially zero from a paraxial point of view. The refracting power being substantially zero refers to a diffraction grating having a focal distance larger than 50 f, where the focal distance of the entire system is denoted as f. The materials in the optical low-pass filter of this embodiment are synthetic resins.

As described above, in this embodiment, because a diffraction grating is used for one of the surfaces of the optical low-pass filter, a low-pass effect is obtained. By making the other surface aspherical, the number of lenses of the fifth lens unit, of the photographing lens, that is used for forming an image, is, for example, about three to five. As a result, various aberrations, such as spherical or comatic aberrations, can be compensated for satisfactorily. The paraxial refracting power of the aspherical surfaces at this time is made substantially zero, so that variations in the optical characteristics caused by the shift of focus are reduced. These variations are caused by a change in the environment, such as in the temperature or humidity, when the optical low-pass filter is formed by molding plastics.

Figure 5:
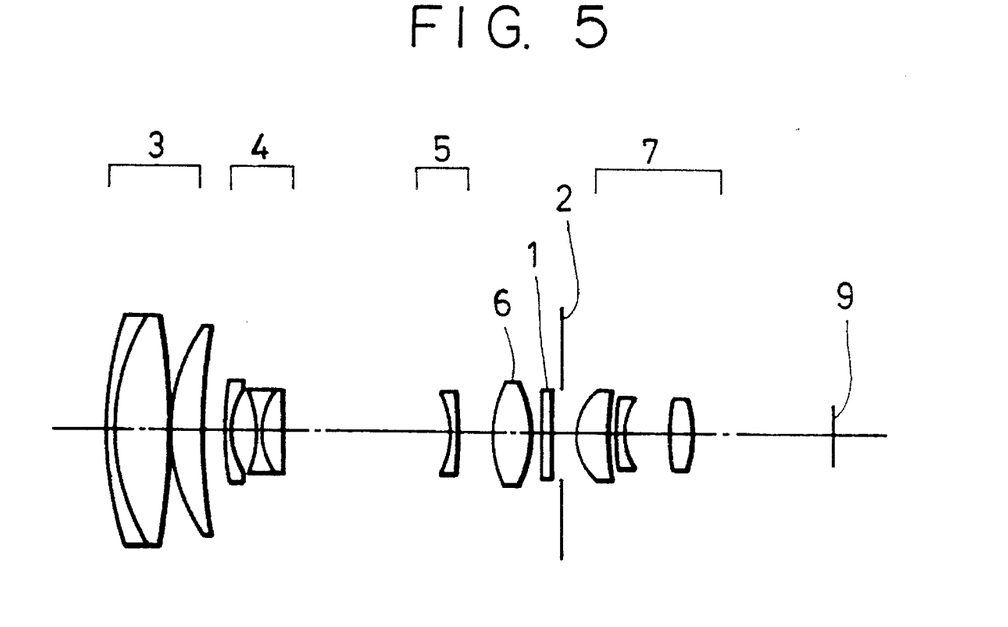
FIG. 5 is a cross-sectional view which illustrates lenses according to numerical data 1 of the present invention.

FIG. 5 is a cross-sectional view which illustrates the lenses according to numerical data 1 which will be described later, in which a zoom type lens of FIG. 1 is used.

Figure 3:
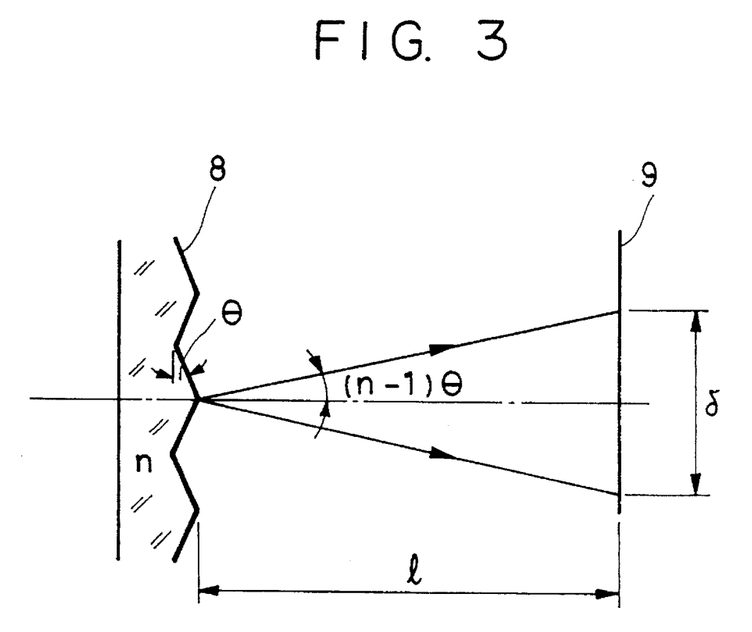
FIG. 3 is a view which illustrates the optical function of the optical low-pass filter of FIG. 1.

FIG. 3 is a view which illustrates the image separation produced by the optical low-pass filter of the present invention. In FIG. 3, reference numeral 8 denotes an optical low-pass filter; and reference numeral 9 denotes an image plane of a CCD (charge coupled device) composed of a plurality of photoelectric conversion elements.

If the image separation width on the image plane 9, by the optical low-pass filter 8, is denoted as δ, the prism angle and the refraction factor of the optical low-pass filter 8 are denoted as θ and n, respectively, and the distance between the optical low-pass filter 8 and the image plane 9 is denoted as L, the image separation width δ can be expressed by the following equation:

$$\delta = 2 L \tan (n-1)\theta \qquad (1)$$

In FIG. 3, the fifth lens unit 7 is omitted for simplicity.

The image separation width δ by the optical low-pass filter 8 should be substantially one half of the pitch of a color separation stripe filter in order to remove spurious color signals of an image reproduced by a single-plate color photographing element.

However, when the optical low-pass filter is disposed inside a zoom lens, because it must be disposed at a position such that it does not obstruct the movement of the lens, the seeming position of the optical low-pass filter relative to the image plane changes due to the zooming.

That is, even if the image separation width δ when the zoom lens is at a wide angle end position is proper in zooming, the image separation width δ when the zoom lens is at a telephoto end position may be improper. Therefore, the optical low-pass filter 8 must be disposed at a position where a change in the image separation width δ, caused by the zooming, becomes smallest. In this embodiment, the optical low-pass filter 8 is disposed nearer to the vicinity of the aperture diaphragm of the image plane than to the magnification section so that the image separation width by the low-pass effect becomes constant even if the magnification is changed.

Figure 4:
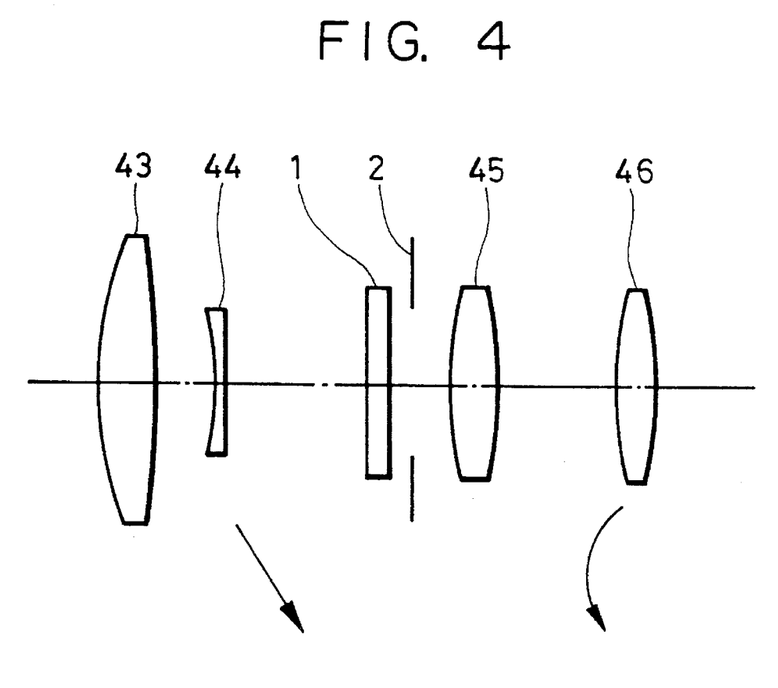
FIG. 4 is a schematic view of an essential portion of an optical system according to a second embodiment of the present invention.

FIG. 4 is a schematic view of an essential portion of an optical system according to a second embodiment of the present invention. In this embodiment, a zoom lens, including four groups of lens units, as a whole is used as a photographing lens. The optical low-pass filter, which is the same as in the first embodiment in FIG. 1, is disposed in the vicinity of the aperture diaphragm of the photographing lens. A predetermined low-pass effect and aberration compensation effect are obtained as in the first embodiment.

In FIG. 4, reference numeral 43 denotes a fixed, first lens unit having a positive refracting power; reference numeral 44 denotes a second lens unit having a magnification function and a negative refracting power; reference numeral 1 denotes an optical low-pass filter having the same shape as that in the first embodiment; reference numeral 2 denotes an aperture diaphragm; reference numeral 45 denotes a fixed, third lens unit having a positive refracting power; and reference numeral 46 denotes a fourth lens unit having functions for both compensating for the shift of an image plane in consequence of a change in magnification, and for focusing.

In this embodiment, a change in magnification from a wide angle end position to a telephoto end position is made by making the second lens unit 44 and the fourth lens unit 46 move as indicated by the arrows. It is brought into focus by making the fourth lens unit 46 move on the light path.

In this embodiment, the number of lenses are reduced by making the other surface of the optical low-pass filter aspherical as in the first embodiment shown in FIG. 1. In particular, the number of lenses of the third lens unit 45 is reduced, and thus the entire lens system is made simpler.

The aspherical shape is expressed by an equation described below when the direction of the optical axis is denoted as the X axis, the direction perpendicular to the optical axis is denoted as the H axis, the direction in which light travels is assumed to be positive, R denotes a paraxial curvature radius, and A, B, C, D and E each are an aspherical factor:

$$X = \frac{(1/R)H^2}{1 + \sqrt{1 - (H/R)^2}} + AH^2 + BH^4 + CH^6 + DH^8 + EH^{10}$$

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded a broad interpretation, so as to encompass all such modifications and equivalent structures and functions.

| Numeric values of Example 1 $F = 1\text{~}7.6 \quad FNO = 1:2.04\text{--}2.25 \quad 2\omega = 48.0°\text{~}6.6°$ ||||
|---|---|---|---|
| R1 = 6.898 | D1 = 0.166 | N1 = 1.80518 | ν1 = 25.4 |
| R2 = 3.480 | D2 = 0.833 | N2 = 1.51633 | ν2 = 64.1 |
| R3 = −13.260 | D3 = 0.027 | | |
| R4 = 3.156 | D4 = 0.500 | N3 = 1.60311 | ν3 = 60.7 |
| R5 = 13.219 | D5 = Variable | | |
| R6 = 5.279 | D6 = 0.111 | N4 = 1.77250 | ν4 = 49.6 |
| R7 = 1.232 | D7 = 0.381 | | |
| R8 = −1.710 | D8 = 0.111 | N5 = 1.77250 | ν5 = 49.6 |
| R9 = 1.325 | D9 = 0.319 | N6 = 1.84666 | ν6 = 23.8 |
| R10 = 4306.543 | D10 = Variable | | |
| R11 = −2.083 | D11 = 0.111 | N7 = 1.77250 | ν7 = 49.6 |
| R12 = −5.425 | D12 = Variable | | |
| R13 = 2.071 | D13 = 0.583 | N8 = 1.51633 | ν8 = 64.1 |
| R14 = −2.284 | D14 = 0.208 | | |
| R15 = Aspherical surface | D15 = 0.138 | N9 = 1.49171 | ν9 = 57.4 |
| R16 = Grating surface | D16 = 0.138 | | |
| R17 = Aperture diaphragm | D17 = 0.28 | | |
| R18 = 1.057 | D18 = 0.458 | N10 = 1.48749 | ν10 = 70.2 |
| R19 = 4.070 | D19 = 0.104 | | |
| R20 = 5.023 | D20 = 0.111 | N11 = 1.76182 | ν11 = 26.5 |
| R21 = 0.919 | D21 = 0.804 | | |
| R22 = 3.354 | D22 = 0.291 | N12 = 1.60311 | ν12 = 60.7 |
| R23 = −2.018 | | | |

In this embodiment, the optical low-pass filter is disposed nearer to the object than to the fourth lens unit which is moved during a change in magnification. As a result, the optical distance between the optical low-pass filter and the image plane changes due to the change in magnification, and the low-pass effect varies. Therefore, changes in the image separation width on the image plane are decreased so as not to pose a problem in practical use by properly setting various constants, such as refracting powers, distances between principal points, or conditions for movement of each lens group.

Figure 6:
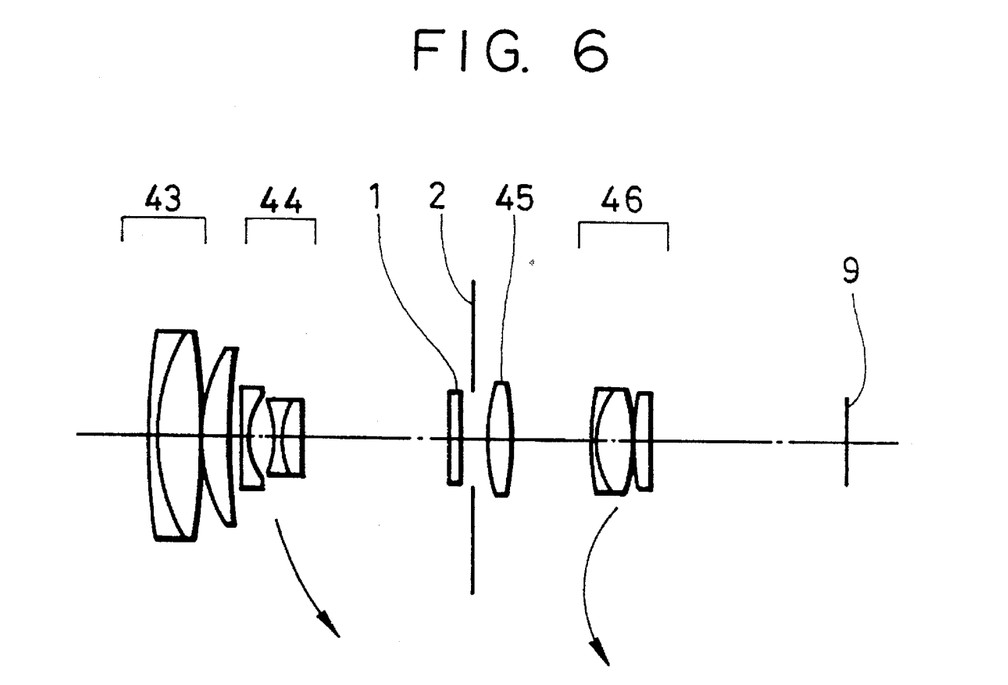
FIG. 6 is a cross-sectional view which illustrates lenses according to numerical data 2 of the present invention.
Figure 7:
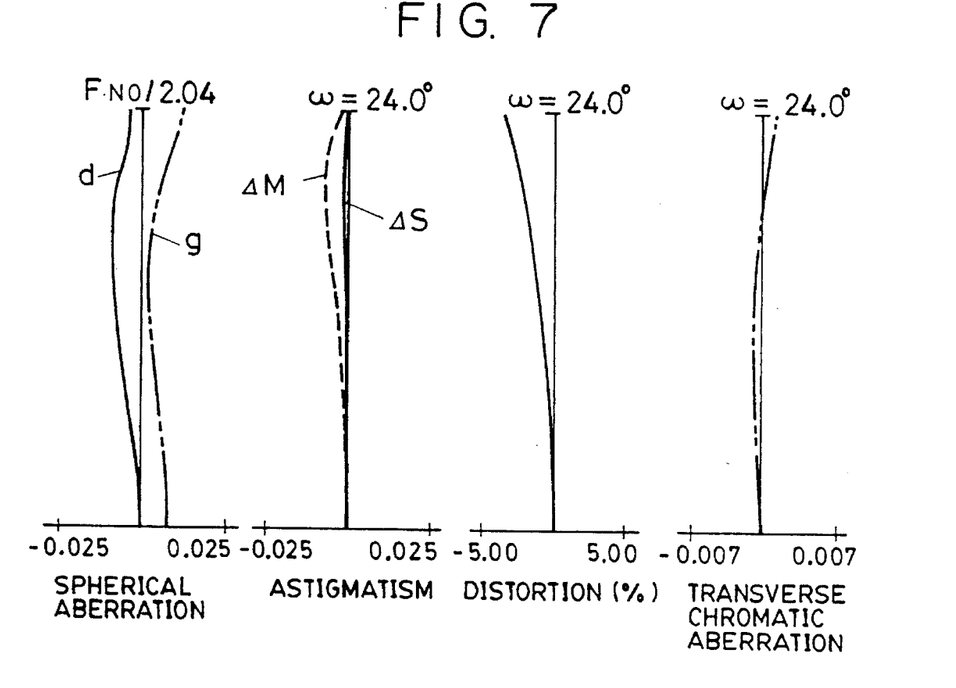
FIG. 7 is a view showing aberrations at the wide angle end position according to numerical data 1 of the present invention.
Figure 8:
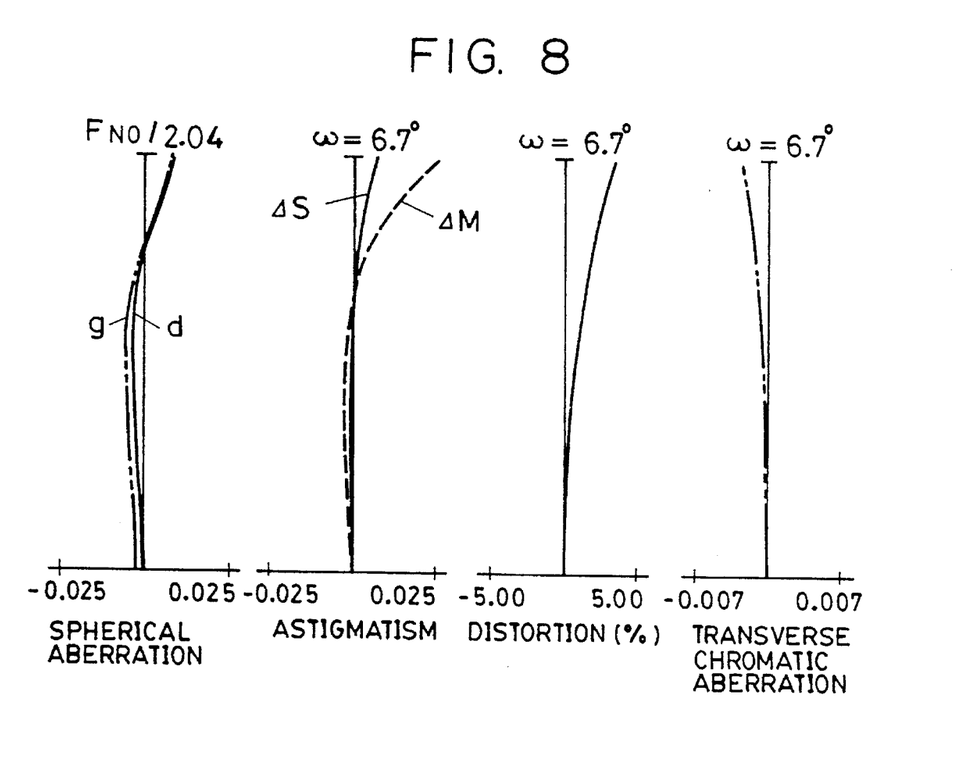
FIG. 8 is a view showing aberrations in the intermediate section between the wide angle end position and the telephoto end position according to numerical data 1 of the present invention.
Figure 9:
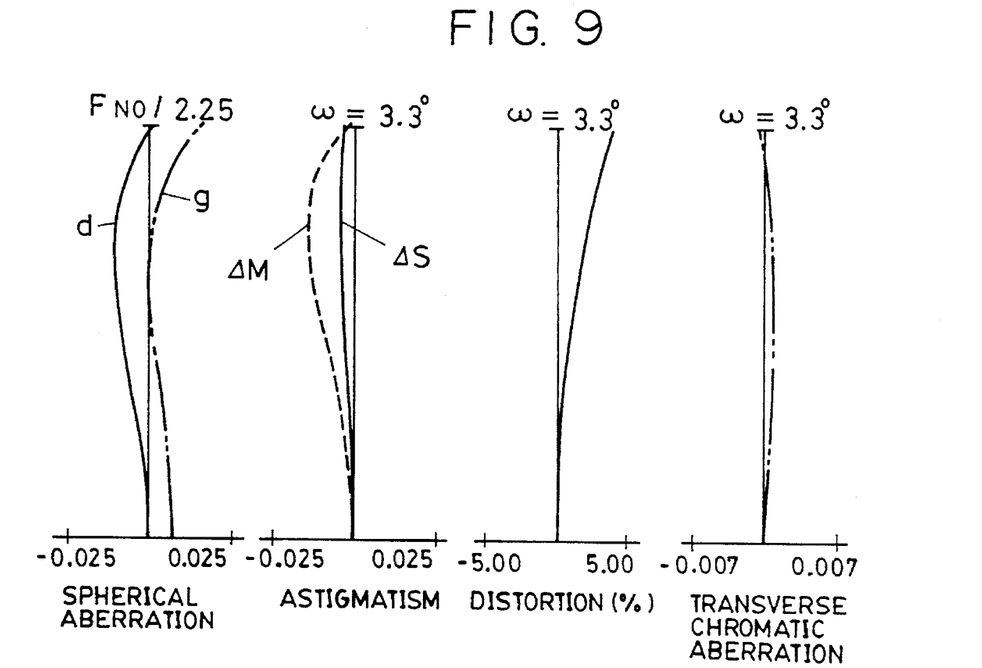
FIG. 9 is a view showing aberrations at the telephoto end position according to numerical data 1 of the present invention.
Figure 10:
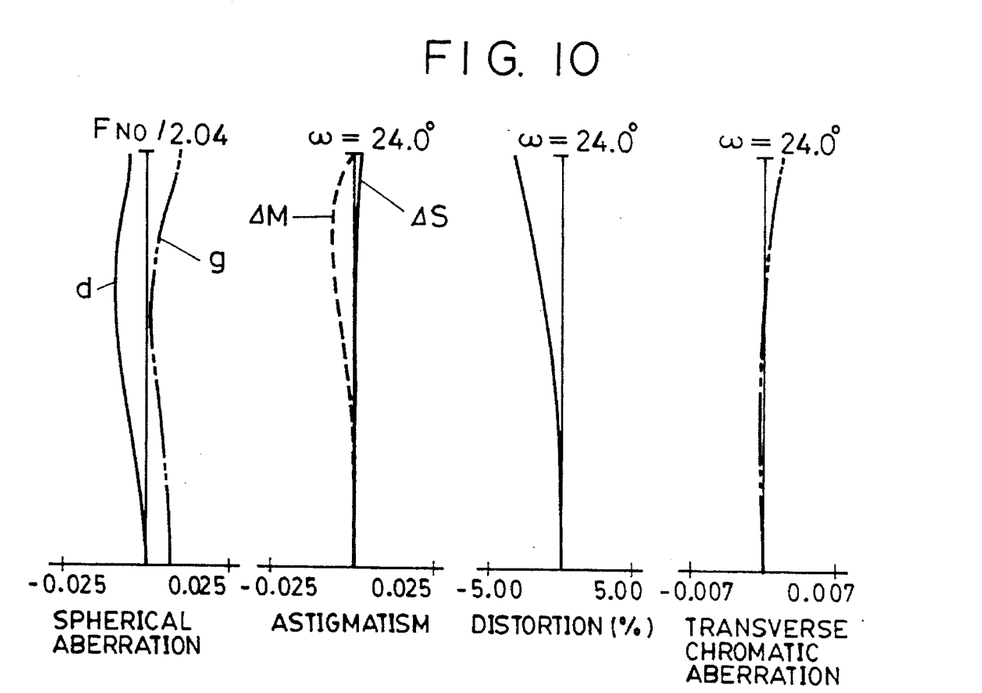
FIG. 10 is a view showing aberrations at the wide angle end position according to numerical data 2 of the present invention.
Figure 11:
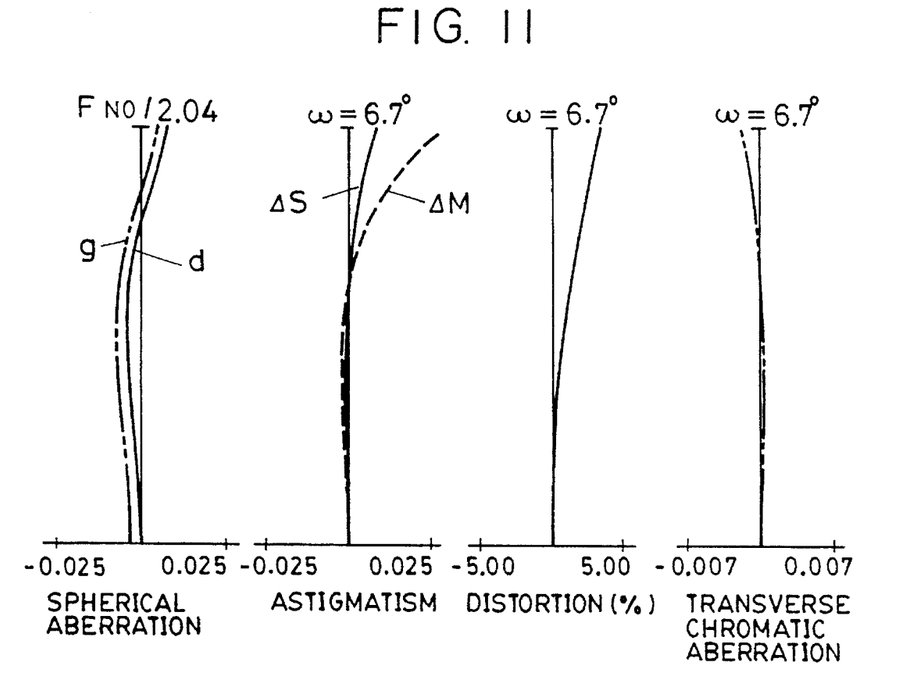
FIG. 11 is a view showing aberrations in the intermediate section between the wide angle end position and the telephoto end position according to numerical data 2 of the present invention.
Figure 12:
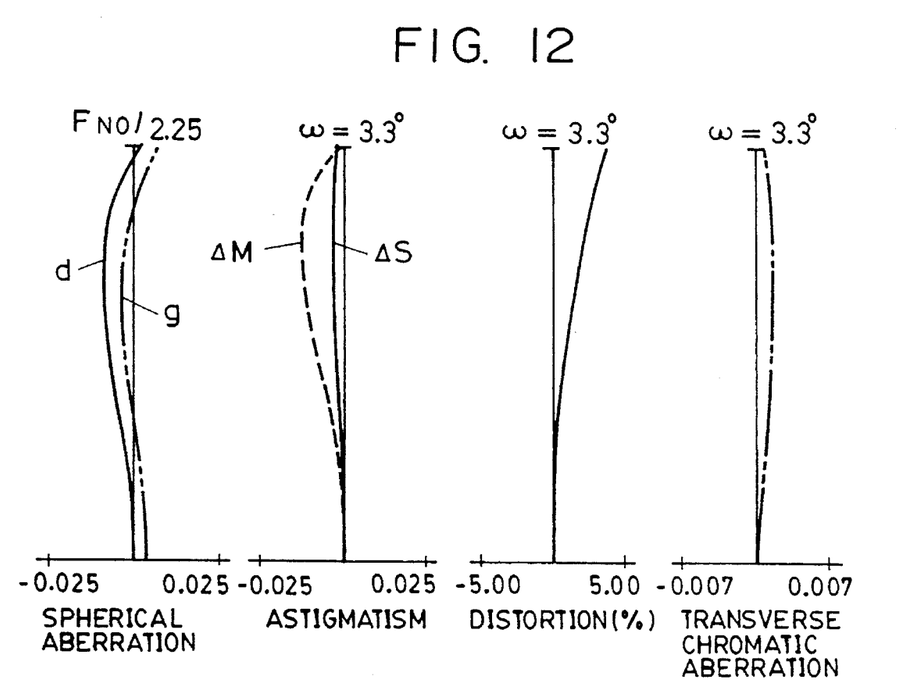
FIG. 12 is a view showing aberrations at the telephoto end position according to numerical data 2 of the present invention.
Figure 13:
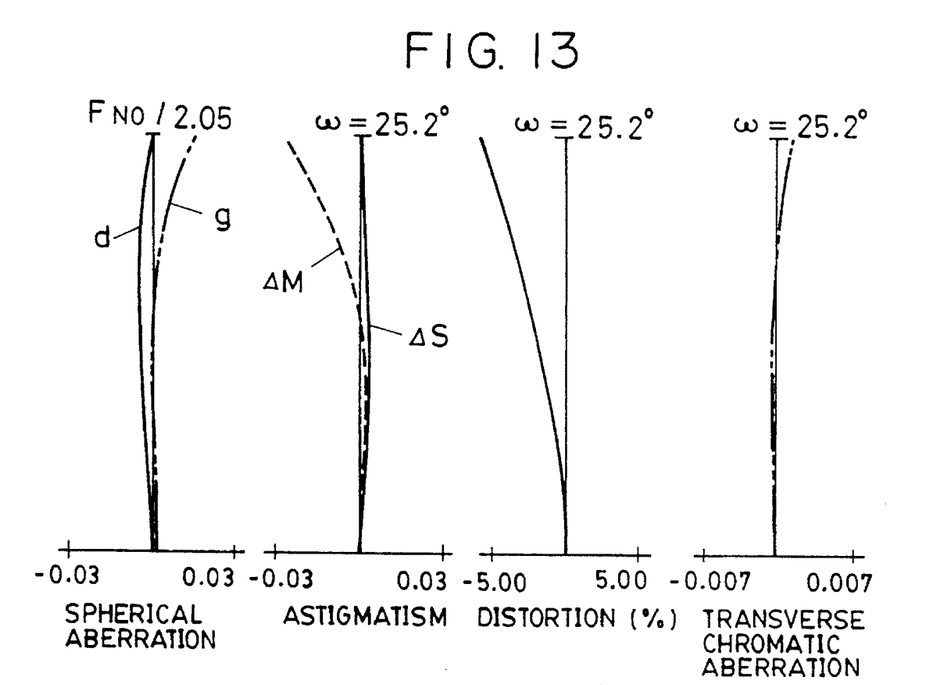
FIG. 13 is a view showing aberrations at the wide angle end position according to numerical data 3 of the present invention.
Figure 14:
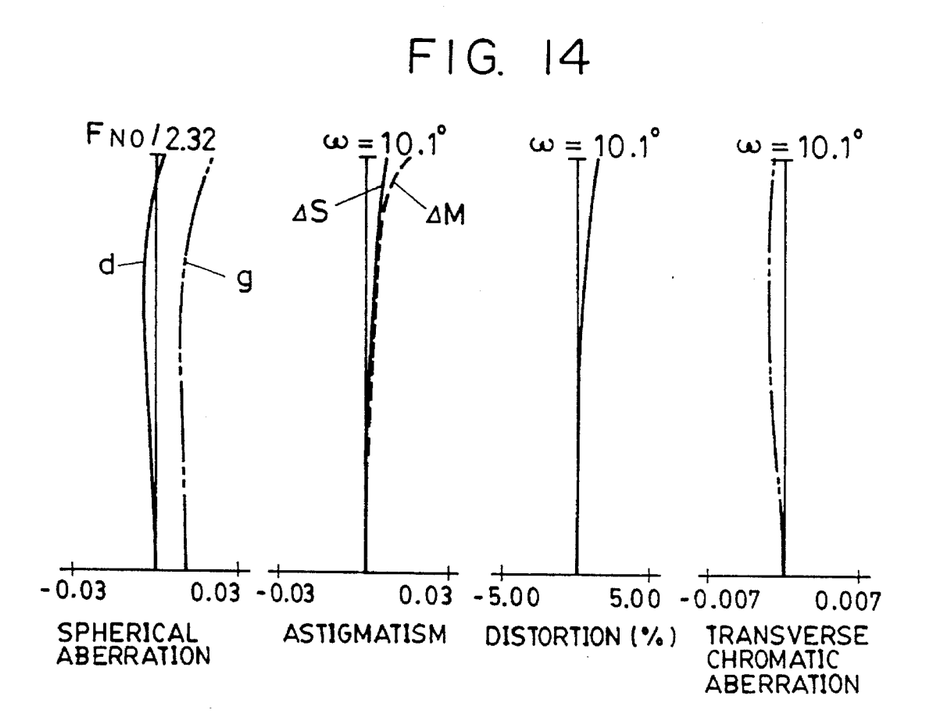
FIG. 14 is a view showing aberrations in the intermediate section between the wide angle end position and the telephoto end position according to numerical data 3 of the present invention.
Figure 15:
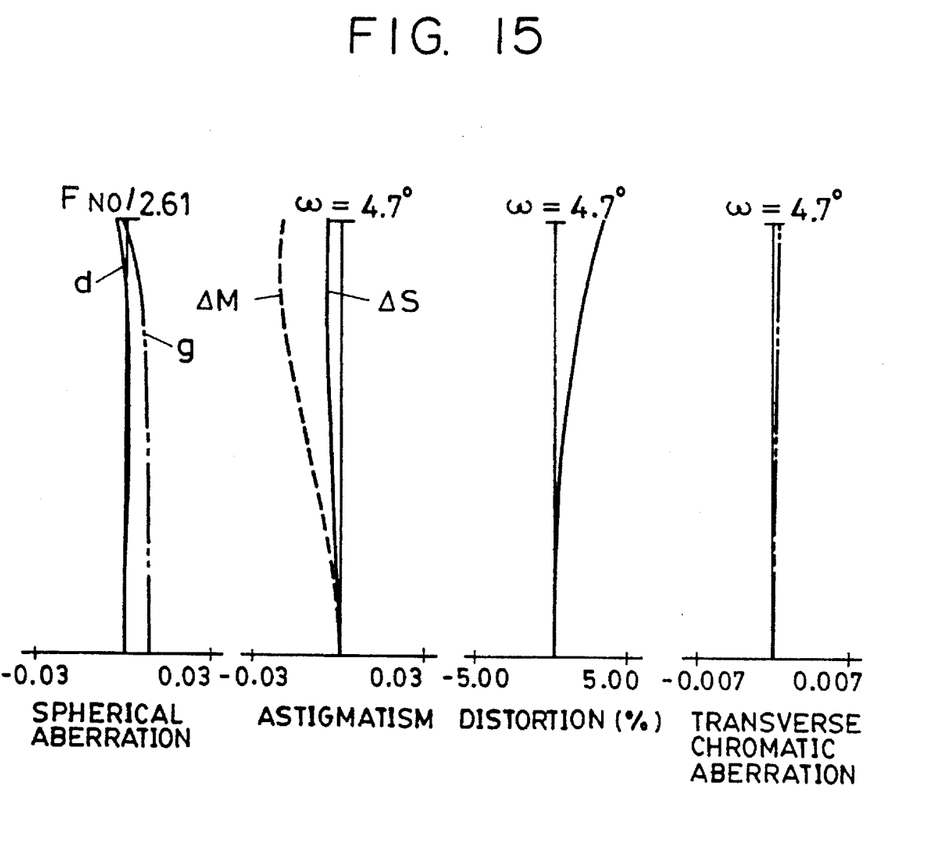
FIG. 15 is a view showing aberrations at the telephoto end position according to numerical data 3 of the present invention.

FIG. 6 is a cross-sectional view which illustrates the lenses, in which the zoom lens of FIG. 4 is used, according to numerical data 2 which will be described later.

Next, numerical data of the present invention will be shown. In the numerical data, Ri denotes a curvature radius of the surface of an i-th lens in order from an object; Di denotes the thickness of an i-th lens from the object and air space; Ni and νi denote the refraction factor and the Abbe number of an i-th lens from the object, respectively.

TABLE 1

| Focal Length Variable Distance | 1.00 | 3.80 | 7.60 |
|---|---|---|---|
| D5 | 0.11 | 1.98 | 2.48 |
| D10 | 2.69 | 0.48 | 0.56 |
| D12 | 0.41 | 0.75 | 0.17 |

| 15th Surface Aspherical Surface ||
|---|---|
| $R_0 = \infty$ | $B = -7.896 \times 10^{-2}$ |
| $C = -2.86 \times 10^{-2}$ | $D = -7.533 \times 10^{-3}$ |

| Numeric values of Example 2 | | | |
|---|---|---|---|
| F = 1~7.6 | FNO = 1:2.04~2.25 | 2ω = 48.0°~6.6° | |
| R1 = 7.843 | D1 = 0.166 | N1 = 1.80518 | ν1 = 25.4 |
| R2 = 3.578 | D2 = 0.833 | N2 = 1.51633 | ν2 = 64.1 |
| R3 = −14.766 | D3 = 0.027 | | |
| R4 = 3.392 | D4 = 0.500 | N3 = 1.69680 | ν3 = 55.5 |
| R5 = 15.466 | D5 = Variable | | |
| R6 = 5.028 | D6 = 0.111 | N4 = 1.77250 | ν4 = 49.6 |
| R7 = 1.225 | D7 = 0.381 | | |
| R8 = −1.696 | D8 = 0.111 | N5 = 1.77250 | ν5 = 49.6 |
| R9 = 1.308 | D9 = 0.319 | N6 = 1.84666 | ν6 = 23.8 |
| R10 = 1009.983 | D10 = Variable | | |
| R11 = −2.084 | D11 = 0.111 | N7 = 1.77250 | ν7 = 49.6 |
| R12 = −5.427 | D12 = Variable | | |
| R13 = 2.060 | D13 = 0.583 | N8 = 1.51633 | ν8 = 64.1 |
| R14 = −2.298 | D14 = 0.208 | | |
| R15 = Aspherical surface | D15 = 0.138 | N9 = 1.49171 | ν9 = 57.4 |
| R16 = Grating surface | D16 = 0.138 | | |
| R17 = Aperture diaphragm | D17 = 0.28 | | |
| R18 = 1.078 | D18 = 0.458 | N10 = 1.51633 | ν10 = 64.1 |
| R19 = 3.759 | D19 = 0.129 | | |
| R20 = 4.807 | D20 = 0.111 | N11 = 1.80518 | ν11 = 25.4 |
| R21 = 0.924 | D21 = 0.762 | | |
| R22 = 3.096 | D22 = 0.291 | N12 = 1.60311 | ν12 = 60.7 |
| R23 = −2.024 | | | |

TABLE 2

| Focal Length Variable Distance | 1.00 | 3.80 | 7.60 |
|---|---|---|---|
| D5 | 0.17 | 2.03 | 2.53 |
| D10 | 2.69 | 0.48 | 0.56 |
| D12 | 0.41 | 0.76 | 0.17 |

| 15th Surface Aspherical Surface | |
|---|---|
| $R_0 = \infty$ | $B = -7.815 \times 10^{-2}$ |
| $C = -2.924 \times 10^{-2}$ | $D = -6.632 \times 10^{-3}$ |

| Numeric values of Example 3 | | | |
|---|---|---|---|
| F = 1~5.75 | FNO = 1:2.05~2.61 | 2ω = 50.4°~9.4° | |
| R1 = 9.759 | D1 = 0.132 | N1 = 1.80518 | ν1 = 25.4 |
| R2 = 2.884 | D2 = 0.500 | N2 = 1.60311 | ν2 = 60.7 |
| R3 = −9.827 | D3 = 0.029 | | |
| R4 = 2.312 | D4 = 0.323 | N3 = 1.71999 | ν3 = 50.3 |
| R5 = 7.262 | D5 = Variable | | |
| R6 = 19.640 | D6 = 0.088 | N4 = 1.78590 | ν4 = 44.2 |
| R7 = 0.820 | D7 = 0.347 | | |
| R8 = −1.194 | D8 = 0.088 | N5 = 1.51823 | ν5 = 59.0 |
| R9 = 1.194 | D9 = 0.264 | N6 = 1.80518 | ν6 = 25.4 |
| R10 = −75.158 | D10 = Variable | | |
| R11 = Grating surface | D11 = 0.147 | N7 = 1.49171 | ν7 = 57.4 |
| R12 = Aspherical surface | D12 = 0.147 | | |
| R13 = Aperture diaphragm | D13 = 0.18 | | |
| R14 = 2.707 | D14 = 0.323 | N8 = 1.60311 | ν8 = 60.7 |
| R15 = −5.323 | D15 = Variable | | |
| R16 = 3.297 | D16 = 0.102 | N9 = 1.84666 | ν9 = 23.8 |
| R17 = 1.304 | D17 = 0.426 | N10 = 1.51633 | ν10 = 64.1 |
| R18 = −2.478 | D18 = 0.022 | | |

TABLE 3

| Focal Length Variable Distance | 1.00 | 2.65 | 5.75 |
| --- | --- | --- | --- |
| D5 | 0.19 | 1.25 | 1.87 |
| D10 | 1.85 | 0.79 | 0.16 |
| D12 | 1.01 | 0.67 | 1.19 |
| 12th Surface Aspherical Surface | | | |
| $R_0 = \infty$ | | $B = 4.701 \times 10^{-2}$ | |
| $C = 2.482 \times 10^{-2}$ | | $D = -1.341 \times 10^{-2}$ | |

What is claimed is:

1. Camera apparatus, comprising:

objective lens means for focusing an image onto a light sensitive medium; and an integral optical low-pass filter member disposed in a light path of said objective lens means, one side of said low-pass filter being formed as a diffraction grating structure having a low pass effect, and said low-pass filter's opposite side being formed in an aspherical shape that compensates for aberrations, wherein said objective lens means comprises lens units separated by a distance having, in order from an object side, a first lens unit having a positive refracting power, a second lens unit having a negative refracting power, a third lens unit having a negative refracting power, and a fourth lens unit having a positive refracting power, wherein zooming is performed by changing the distance between the lens units.

2. A camera apparatus according to claim 1, wherein said objective lens means comprises an aperture diaphragm and said optical low-pass filter is located between the second and third lens units.

3. A camera apparatus according to claim 2, wherein focusing is performed by moving the fourth lens unit.

4. A camera apparatus according to claim 3, wherein said optical low-pass filter is formed of material comprising synthetic resins.

5. Camera apparatus comprising:

objective lens means for focusing an image onto a light sensitive medium; and an integral optical low-pass filter member disposed in a light path of said objective lens means, one side of said low-pass filter being formed as a diffraction grating structure having a low-pass effect, an opposite side of said low-pass filter being formed in an aspherical shape that compensates for aberrations, said objective lens means comprising lens units separated from each other and having, in order from an object side, a first lens unit having a positive refracting power, a second lens unit having a negative refracting power, a third lens unit having a positive refracting power, and a fourth lens unit having a positive refracting power, wherein zooming is performed by changing the distance between the lens units.

* * * * *

UNITED STATES PATENT AND TRADEMARK OFFICE
CERTIFICATE OF CORRECTION

PATENT NO. : 5,568,197
DATED : October 22, 1996
INVENTOR(S) : HIROYUKI HAMANO

It is certified that error appears in the above-indentified patent and that said Letters Patent is hereby corrected as shown below:

On the title page, item

[56] References Cited

"4,176,611 12/1979 Okano" should read
--4,178,611 12/1979 Okano--.

"Ishidai et al." should read --Ishibai et al.--.

Signed and Sealed this

Fourth Day of March, 1997

Attest:

BRUCE LEHMAN

*Attesting Officer*     Commissioner of Patents and Trademarks